Dec. 7, 1926.　　　　　W. H. BOUTELLE　　　　1,609,902

SPECTACLE HINGE

Filed June 4, 1925

Inventor

William H. Boutelle.

By Harry H. Styll.

Attorney

Patented Dec. 7, 1926.

1,609,902

UNITED STATES PATENT OFFICE.

WILLIAM H. BOUTELLE, OF STURBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

SPECTACLE HINGE.

Application filed June 4, 1925. Serial No. 34,871.

This invention relates to new and useful improvements in the construction of spectacles, and has particular reference to a new and novel hinge employed in connection therewith.

In the construction of frames made from zylonite prior to the present invention, it has been necessary that each temple be individually fitted to the front of the frame to which it has been assembled, with the result that in the past all zylonite fronts leaving the factory have been equipped with temples. Because of the particular construction of hinges now being used, the temple has required filing, as has also the end piece to which it is fitted, and consequently the temples are not interchangeable, but instead can only be used in connection with the particular front to which it was originally assembled at the factory. This imposes quite an unnecessary hardship on the people in the trade, inasmuch as it is necessary for them to carry a great many extra parts in order to be prepared to supply the needs of their customers. In other words, there are several different standard sizes of fronts, and also a number of different styles and lengths of temples, and as the temple has had to be individually fitted to the front and is not interchangeable, it is necessary that the optical dealer not only carry a supply of the various sizes of fronts, but that he also have each of these sizes equipped with temples of different styles and lengths. Heretofore it has not been possible for the people in the trade to carry a stock of differents tyles and lengths of temples separately from different sized fronts and then assemble any particular temple relative to a particular front as may be needed.

It is, therefore, one of the primary objects of the present invention to provide temples separate from the fronts, which temples are interchangeable and can be assembled relative to any desired front.

Another object of the invention is to provide a temple and a front of such an improved construction as to do away with the necessity of any hand fitting during the assembling of these parts.

Another object of the invention is to accomplish the above through the medium of a new and novel hinge connection between the temples and the front of the frame.

Another object is to provide a hinged connection between the temple and the front which will be of greater strength than those heretofore produced.

Still another object is the provision of a hinged connection which is simple in its construction, efficient in the performance of its functions, and which will be pleasing in appearance.

With these and other objects in view the invention resides in the novel construction, combination and arrangement of parts hereinafter more fully described, illustrated in the accompanying drawing, and particularly pointed out in the appended claims.

In the drawings forming a part of this application, and wherein like reference characters are used to designate corresponding parts throughout the several views.

Figure 1:
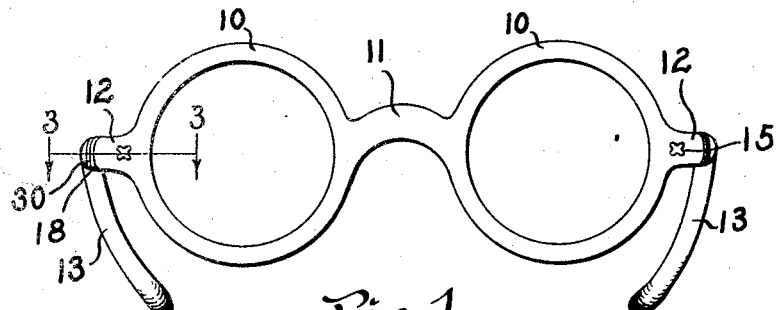
Figure 1 is a front elevation of a spectacle frame, in connection with which is shown a hinge connection constructed in accordance with the present invention.
Figure 2:
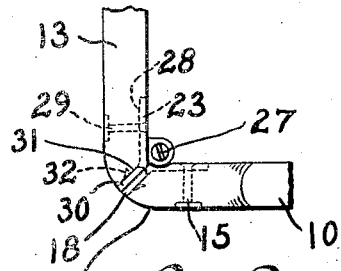
Figure 2 is a top plan view thereof.
Figure 3:
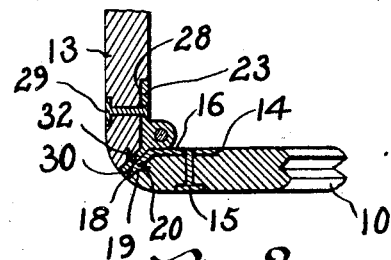
Figure 3 is a sectional view taken on line 3—3 of Figure 1.
Figure 4:
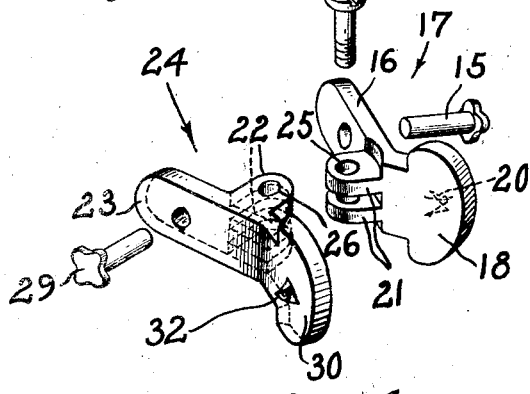
Figure 4 is a perspective view of the hinge members detached from the temple and the front.

Referring more particularly to the accompanying drawing, in which is illustrated a preferred embodiment of the present invention, it will be noted that there is employed a frame formed from zylonite, and comprising a pair of eye pieces 10, being connected by means of a suitable bridge 11, each eye piece 10 being formed with an integral end piece 12 to which are fastened by means of the present improved hinge connection, the usual temples 13.

The inner face of each of said end pieces 12 is recessed as at 14 and secured within said recess by means of a rivet or the like 15, is the base portion 16 of the hinge member, designated generally by the reference character 17. Formed integrally with the base portion 16, and extending outwardly therefrom at an angle of 45 degrees, is an ear 18, which contacts with the correspondingly outwardly bevelled end face 19 of the end piece 12, said ear 18 being provided with a struck out barb or the like 20, which bites into the end piece, to more firmly hold the hinge member in position relative thereto.

The base portion 16 is also provided immediately adjacent the ear 18 with the spaced lugs 21, which are arranged to be inter-engaged with corresponding lugs 22 carried by the base portion 23 of the complemental hinge member designated generally by the reference character 24. The spaced lugs 21 and 22 are formed with the openings 25 and 26, respectively, which are adapted to register with each other, and through which is arranged to be inserted a pivot pin, or the like, 27, whereby the said members will be held together, and also permitted to be swung relative to each other.

The complemental hinge member 24 is arranged to be carried by the temple 13, and is almost identical to the hinge member 17 in its construction. The temple is formed in its inner face with a recess 28, within which is secured by means of a rivet or the like 29, the base portion 23, which base portion is also formed with an ear 30 extending at an angle of forty-five degrees thereto, this ear engaging with the correspondingly outwardly bevelled face 31 of said temple, and having a struck out barb or the like 32, which bites into the end face 31 whereby to more firmly retain the hinge member in position.

In the assembling of the frame the hinge members 17 and 24 are first secured within the recesses 14 and 28 of the end piece 12, and the temple 13, respectively, in the manner above stated, after which the lugs 21 and 22 are inter-engaged and the pivot pin 27 inserted through the registering openings 25 and 26. As already stated, the ears 18 and 30 extend outwardly from their respective base portions at an angle of forty-five degrees, and engage with the correspondingly outwardly bevelled end faces of the end piece 12 and the temple 13, respectively. Thus, when the temple has been assembled relative to the front the said ears are arranged to engage and fit snugly against each other, as is clearly illustrated in the drawings.

With this construction of hinge the front of the frame can be equipped with one hinge member, and the temple equipped with another, and the parts can then be sold separately and the temples can be assembled in connection with any front. In this way the temple may be fitted exactly to the hinge at the factory and there will be no question but what the two halves of the hinges will be interchangeable.

This construction not only saves time and labor in the production of the frames, as it does away with the necessity of any hand fitting, but also permits the optical dealer to carry a minimum number of parts and still be in a position to supply the needs of his customers.

Although there has been shown and described one form of the present invention, it is to be understood that in the commercial production of the device various minor changes in the particular construction and arrangement may suggest themselves, and the right is hereby reserved to depart from the specific details disclosed herein in so far as such changes remain within the spirit of the invention as defined by the appended claims.

Furthermore, while the invention has been described as being used in connection with a spectacle frame made from zylonite, it will be readily appreciated that it may be employed in connection with a frame of any composition material.

What is claimed is:

1. In a construction of the character described, the combination with a front and a temple, of a hinge member secured to said front, a complemental hinge member secured to said temple, each of said hinge members being formed with a terminal ear extending at an acute angle to the longitudinal axis of said front and temple respectively, said ears arranged to abut against each other.

2. In a construction of the character described, the combination with a front and a temple, of a hinge member secured to said front, a complemental hinge member secured to said temple, each of said hinge members comprising a base portion and a terminal ear extending at an acute angle thereto, said ears arranged to abut against each other.

3. In a construction of the character described, the combination with an end piece and a temple, of a hinge member secured to said end piece, a complemental hinge member secured to said temple, each of said hinge members comprising a base portion, and an ear extending at an angle thereto, and bearing against the correspondingly beveled end faces of said end piece and temple, respectively.

4. In a construction of the character described, the combination with an end piece and a temple, of a hinge member secured to said end piece, a complemental hinge member secured to said temple, each of said hinge members comprising a base portion, and an ear extending at an angle thereto and bearing against the correspondingly beveled end faces of said end piece and temple, respectively, and arranged to abut against each other.

5. A hinge connecting the temples and the front of a spectacle frame, comprising a pair of hinge members secured to said temple and front respectively, each of said hinge members comprising a base portion having an ear extending at an angle thereto, said ears engaging the correspondingly beveled faces of the temple and front respectively, and arranged to abut against each other.

6. A hinge connecting the temple and the end piece of a spectacle frame, comprising a pair of hinge members secured to the temple and end piece respectively, each of said hinge members including a base portion having an ear extending outwardly at an angle thereto, said ears engaging with the correspondingly outwardly beveled end faces of the temple and end piece respectively, and arranged to fit snugly against each other, the said ears being also provided with means for engagement with said temple and front respectively, whereby to more firmly retain said hinge members in position.

7. In a construction of the character described, the combination with a front and a temple, of a hinge member secured to said front, a complementary hinge member secured to said temple, interengaging lugs carried by said hinge members, and means for securing said lugs together, the adjacent ends of the hinge members being formed with terminal ears extending at an angle to the longitudinal axis of said front and temple, respectively, and arranged to abut against each other.

WILLIAM H. BOUTELLE.